Patented Oct. 22, 1940

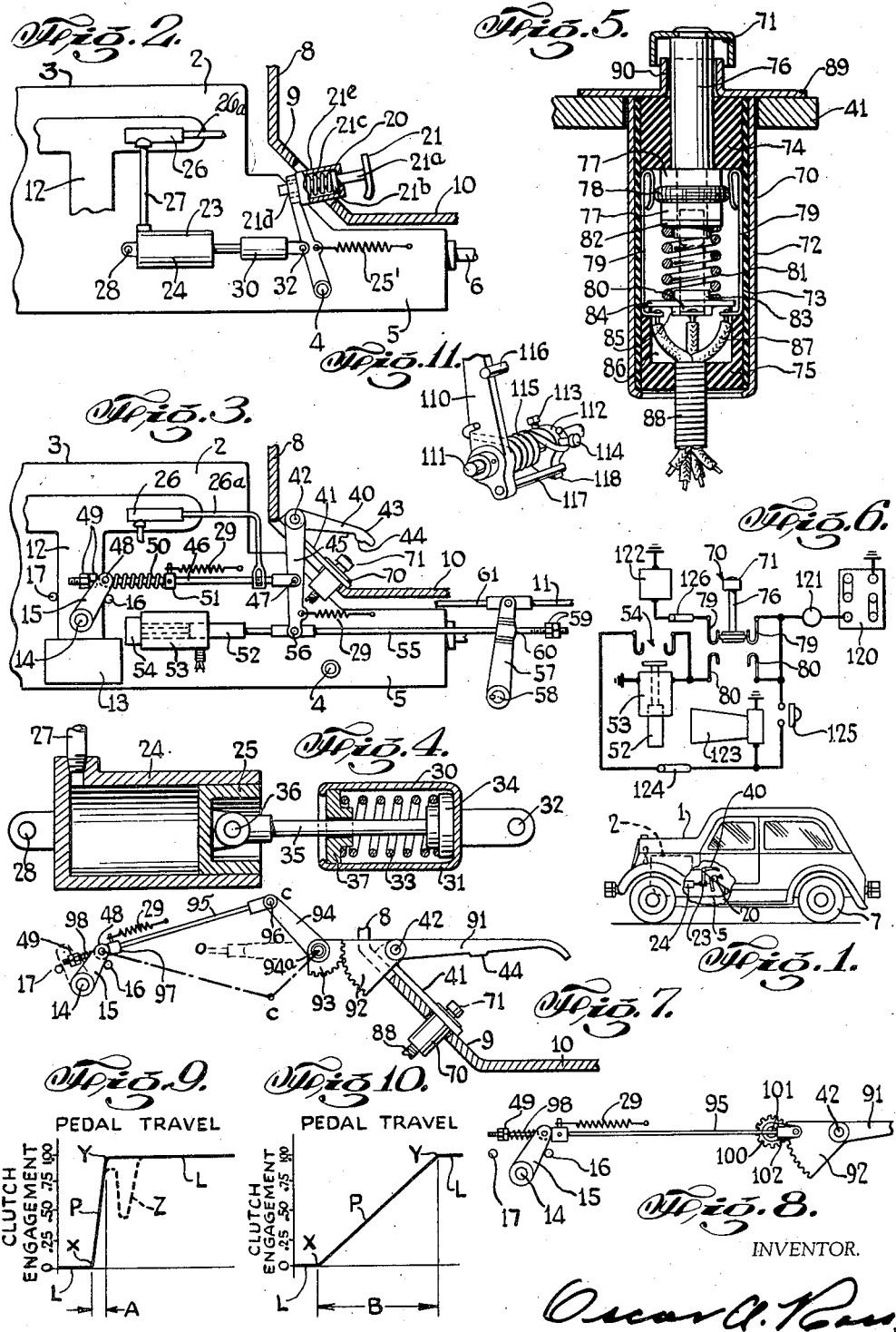

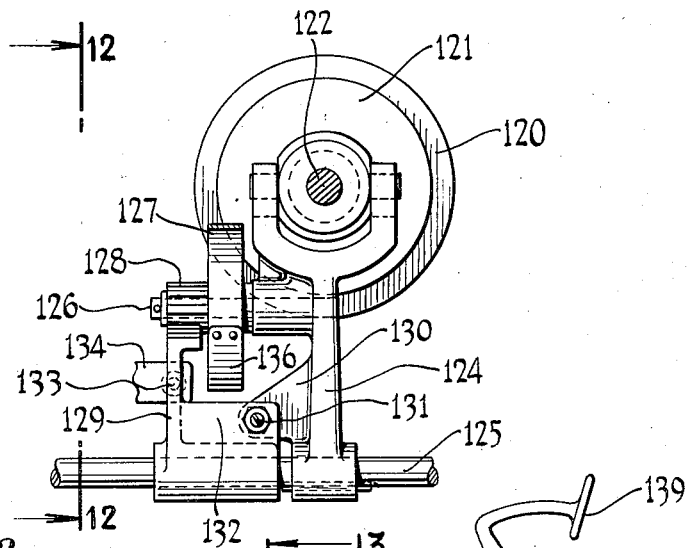
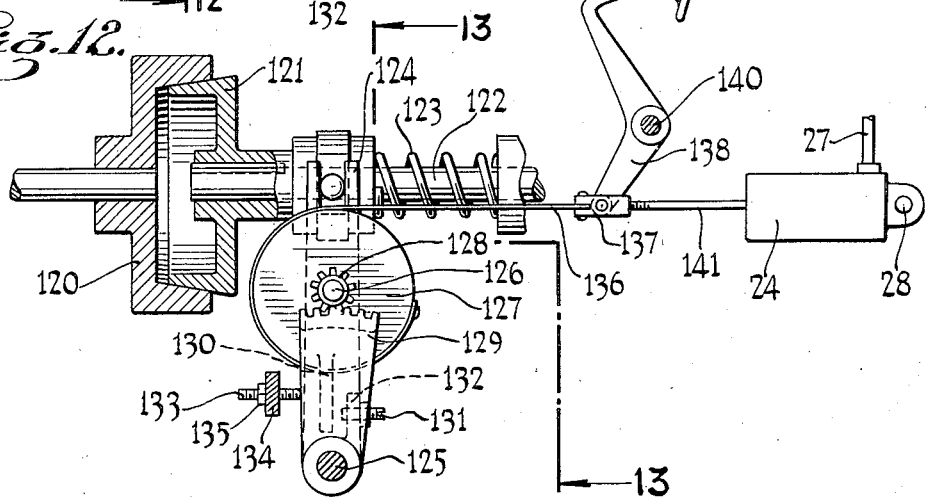
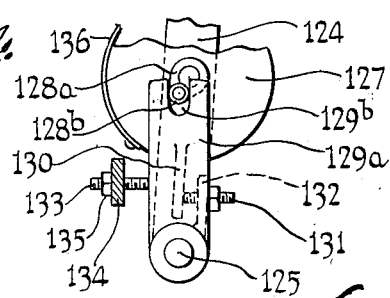

2,218,723

UNITED STATES PATENT OFFICE 2,218,723

CLUTCH OPERATING APPARATUS

Oscar A. Ross, Los Angeles, Calif.

Application June 17, 1939, Serial No. 279,702

13 Claims. (Cl. 192—82)

This invention relates to self-propelled vehicles and more particularly to that form propelled by hydro-carbon motors, and forms a continuation in part application of my co-pending application Serial No. 79,803, filed, May 14, 1936.

The clutch between the motor and transmission of present motor-driven vehicles, whether operated by a foot pedal or a power operated device has the disadvantage that the period between initial and full engagement of said clutch represents comparatively small portion of the operating stroke of said pedal or power operated device, and therefore unless the pedal or power operated device is operated at a comparatively slow rate through this portion of said stroke, the clutch grabs or locks causing a jerking forward of the vehicle with a possible stalling of the motor. This invention comprehends overcoming this difficulty by materially lengthening that portion of the stroke of the pedal or power operated device which represents the difference between the point of the initial engagement and the point of full engagement of the clutch thereby softening the transmission of power from the engine to the vehicle when starting, at the same time permitting a substantially constant movement of said pedal or power operated device during the clutch engagement operation.

The lengthening of the stroke portion of said pedal or power operated device corresponding to the period of clutch engagement also reduces the tension on the part of operators who use the pedal in preference to a power operated device for engaging and disengaging the clutch, since the clutch pedal may be comparatively quickly moved from disengaged to engaged position without causing a jerking forward of the vehicle, or stalling of the engine.

Furthermore, while driving vehicles, operators often meet emergencies and become confused, at which time they depress the accelerator pedal very hard believing it to be the brake pedal, and therefore, instead of preventing an accident they increase its hazards. This invention comprehends inter-connecting the accelerator pedal of a vehicle, the ignition apparatus thereof and the braking system thereof whereby upon abnormal depression of an accelerator pedal the ignition is cut off and the brakes are applied.

The invention further comprehends novel control of the motor or engine throttle valve by the accelerator pedal whereby said throttle valve is maintained in the idling position at both the released and fully depressed positions and is moved to the full open position during the movement of said accelerator pedal from released to fully depressed positions, the accelerator pedal also being arranged to control the brake mechanism of the vehicle supporting said accelerator pedal.

The invention further comprehends novel and peculiar circuits and apparatus for accomplishing the aforesaid.

Other advantages and novel features of the invention will be apparent as the description thereof progresses and the novel structure is pointed out therein, and wherein:

Figure 1 is a side elevational view of a motor vehicle supporting the various embodiments of the invention, and Fig. 2 is a part sectional view of the same showing the clutch control thereof and Fig. 3 is also a part sectional view of said vehicle showing a combined throttle valve and brake mechanism control, and Fig. 4 is a sectional view in detail showing part of the clutch controlling mechanism, and Fig. 5, is a sectional view of a circuit controller employed on said vehicle, and Fig. 6, is a circuit plan employed on said vehicle, and Fig. 7, is a part sectional view of a modified form of throttle valve and brake control, and Fig. 8, is still another modified view of the same, and Figs. 9 and 10, are charts showing the difference between the engagement of present clutches and the engagement of a clutch operated in accordance with this invention. Fig. 11 is a perspective view of a modified portion of the invention, and Fig. 12 is a part sectional, part elevational view of a modified form of clutch operating mechanism taken on line 12—12 of Fig. 13, and Fig. 13 is an end view of the same taken on line 13—13 of Fig. 12, and Fig. 14 is a detailed part elevational view of a modified portion of the mechanism shown in Figs. 12 and 13.

Referring to Figs. 1, 2 and 3 vehicle 1 includes a power generating and transmission unit 2 including the usual motor, as 3 and a clutch (not shown) arranged to be disengaged upon counter-clockwise rotation of shaft 4 and engaged by clockwise rotation thereof, and transmission unit 5 driving propeller shaft 6 arranged to rotate rear wheels 7. Said vehicle further includes dash-board portion 8 and floor board portions 9 and 10. Said vehicle further includes a braking mechanism, the brakes of which are arranged to be operated upon movement of rod 11 to the left. Motor 3 includes inlet manifold 12, carburetor 13 and throttle valve shaft 14 arranged to move the throttle valve to the idling or closed position when lever 15 engages stop 16 and move to the full open position when said lever engages stop 17.

Clutch shaft 4 is normally rotated clock-wise to the engaged position of the clutch by a comparatively powerful spring (not shown), foot pedal 20 secured thereto being shown in the engaged position. Spring 25' having one end thereof fixed to said vehicle and the other end secured to said pedal is merely for the purpose of taking up the lost motion in the clutch mechanism after said clutch has been engaged by pedal 20 and thereby preventing the rattling of these parts while said vehicle is being operated. Whereas clutch pedal may be depressed by the foot extension 21 said pedal as shown is preferably operated by a power operated device 23 comprising vacuum cylinder 24 having piston 25 operating therein and moved to the left under the influence of vacuum from manifold 12 controlled by valve 26 and flowing through pipe 27, cylinder 24 being pivoted on pin 28. Vacuum controlling valve 26 may be of the form disclosed in Patent No. 1,470,-272 to Belcia, dated October 9, 1933, the valve operating rod 26a being connected to throttle valve operating rod 46 for movement by accelerator pedal 40.

Said power operated device 23 further includes a balancing unit 30 comprising a housing 31 pivotally secured to pedal lever 20 by pin 32 and in which is positioned tensioned compression spring 33, one end of which engages allocating portion 34 of connecting rod 35, the other end of which is pivotally secured to piston 25 by pin 36, the opposite end of said spring impinging on allocating washer 37 secured to housing 30.

Throttle valve lever 15 is controlled by accelerator pedal 40 pivoted to bracket 41 by pin 42. Accelerator 40 comprises foot depressing portion 43 having boss 44 arranged to engage button 71 of circuit controller 70 secured to bracket 41 and also includes operating lever portion 45 having one end of a link connection secured thereto by pin 47 and the other end thereof slidable in boss 48 pivoted to lever 15. Adjustable nuts 49 normally engage boss 48 through spring 50, one end of which impinges against collar 51 secured to rod 46 and the other end of which engages boss 48, thereby tending to move rod 46 to the right and affecting engagement of nuts 49 with boss 48. To the lower end of lever 45 is pivotally secured armature 52 arranged to be moved to the left into solenoid 53 when said solenoid is energized, said movement being arranged to jointly move link 55 also pivoted to lever 45 by pin 56 also serving to pivotally support armature 52, to the left, said link being slidable through brake operating lever 57 arranged to operate the brake mechanism of said vehicle through rod 11, lever 57 being pivotally supported on pin 58. Rod 55 is supplied with adjustable nuts 59 arranged to engage boss 60 of lever 57 for the movement thereof to the left and thereby apply said brakes. Armature 52 is also arranged to establish a circuit in circuit closer 54 as more fully hereinafter described. Brake rod 11 is also arranged to be operated by link 61 actuated by the usual brake pedal not shown, a suitable lost motion mechanism being interposed between said brake lever and rod 61 whereby said lever may remain stationary when said rod is moved to the left.

Referring to Fig. 5, circuit controller 70 comprises metal casing or sleeve 72 supporting insulating sleeve 73 and insulating bushing 74 at the upper end and insulating bushing 75 at the lower end thereof. Plunger unit 76 comprises dirt protecting cap or button 71 secured to the exposed end thereof, the opposite end supporting insulating collars 77 clampably allocating circuit bridging member or ring 78 arranged to establish a circuit through contact members 79—70 in the upper position thereof and contact members 80—80 in the lower position thereof, only one of said last-named members being shown. Collars 77 are normally held in position by compression spring 81, one end of which impinges against metal washer or allocating collar 82, and the other end of which impinges against a similar collar 83 seated on insulating disc 84. Insulating member 85 is supplied with suitable notches for allocating members 79 and 80 and is also supplied with a recess 86 receiving the several conductors 87 of cable 88 extending through said insulating member 75. Metal sleeve 72 is suitably secured to flange member 89 having dirt protecting upstanding portion 90. Circuit controller 70 is preferably suitably secured to bracket 41.

Referring to Fig. 7, showing another embodiment of the invention, modified accelerator pedal 91 includes gear sector portion 92 meshing with gear sector portion 93 of operating lever 94 pivotally secured to link 95, one end of which is slidable in boss 48 of throttle valve lever 15 and the other end of which is pivoted to lever 94 by pin 96. Collar 97 rigidly secured to rod 95 is normally arranged to impinge on boss 48 by the action of spring 98 interposed between said boss 48 and adjusting nuts 49. Lever 94 is pivoted on stud 94a.

Referring to Fig. 8, showing a modified accelerator unit, accelerator 91 is arranged to have the sector 92 thereof engage a pinion 100 which is rotated substantially one complete revolution upon the operation of lever 91 from fully release to fully depressed positions or upon the reverse of said movement between said positions. Pinion 100, supported on stud 101, is arranged to rotate operating lever 102. It is to be noted that said lever is so positioned during the extreme released and depressed positions of accelerator pedal 91, that the axis of the operating link or rod 95 intersects the axis of stud 101. By this arrangement a comparatively small movement of the throttle valve occurs with respect to movement of pedal 91 during the initial and extreme movements thereof. This permits comparatively large movement of accelerator pedal 91 during the normal driving periods of a vehicle and therefore relieves the tension of the operator in attempting to make minute movements of said pedal as is the present prevailing rule. This comparative movement of accelerator pedal 91 and throttle valve lever 15 will be understood without entering into a discussion of sines or co-sines of angles. This arrangement has the further advantage that an operator may remove his foot from the pedal whereupon the motor will return to idling speed, then depress said pedal for accelerating said motor to maximum speed, and thereafter further depress said pedal for decelerating said motor speed and simultaneously depressing button 71 for applying the brakes and cancelling the operation of said motor where the circuit controllers 79 are employed for cancelling the ignition of said motor.

Referring to Fig. 11, showing a modified form of balancing unit 30 preferably to be employed on newly manufactured cars, clutch pedal 110 is rotatably supported on clutch operating shaft 111, suitable collars being supplied on each side of said lever for preventing axial movement on said shaft. Collar 112 is fixed to shaft 111 by set screw 113 or a suitable taper pin, said collar having pin or extension 114 engaging one end of compression spring 115. The other end of said spring engaging the extension of lever 110. Spring 115 is normally under tension and arranged to rotate lever 110 clock-wise with respect to shaft 111 until stop member 117 formed on said lever engages stop member 118 of collar 112.

Referring to the chart shown in Figs. 9 and 10, the ordinates of these charts represent pedal travel or rotation of shaft 4 whereas the abscissas represent engagement between the clutch engaging members. Fig. 9 represents the curve of clutch engagement of conventional clutches. The point X representing initial engagement of opposite members of the clutch and the point Y representing full engagement between said members. It will be noted from Fig. 9 that the period of engagement of conventional clutches represented by A is comparatively short and therefore an operator must have a very sensitive response in order to permit a clutch to engage without producing a jerking movement of the vehicle. One customary practice is to permit the clutch to engage and then quickly disengage and again re-engage said clutch as represented by the dotted line Z, this practice being effected in certain power operated devices now in use. However, since the period of engagement corresponding to A is not changed, a very fine adjustment between the mechanism affecting this double clutch engagement and the clutch mechanism must be maintained since maladjustment between these elements would either permit the clutch to engage before said mechanism is effective to produce the softening effect or after said softening effect has taken place.

Fig. 10 illustrates the clutch engagement obtained by this invention, the initial clutch engagement occurring at X and the final clutch engagement occurring at Y, the period of clutch engagement being represented by B and since the period of clutch engagement represented by B is many times that represented by A, maladjustment between a power operated clutch mechanism and the clutch mechanism per se does not materially affect the operation of obtaining soft engagement of said clutch mechanism.

It is to be understood that in using the term "clutch" is meant a unit having driving and driven elements normally engaged by movable members including a spring, acting to effect engagement between said driving and driven members, said movable members being arranged to effect this engagement therebetween, upon movement of said movable members, the driving elements being driven by the motor of vehicle 1, and the driven elements acting to effect propulsion of said vehicle through the wheels 7 thereof.

Assume the driving and driven elements of the clutch are to be disengaged and re-engaged by power operated device shown in Fig. 2, and assuming further that the clutch is in engaged position as shown in said figure, vacuum produced in cylinder 24, by operation of valve 26, acts to move piston 25 to the left. During the initial movement of piston 25, corresponding to the portion of pressure curve P from the left margin of the chart to the point X, and which also corresponds to the slack motion portion of the clutch lever travel, said piston, unit 30 and clutch lever move substantially synchronously. As soon as clutch lever 20 begins to effect disengagement of said driving and driven members, and thereby beginning to overcome the comparatively high pressure of the clutch spring, the clutch lever ceases movement and the continued movement of piston 25 to the left acts to compress spring 33. Preferably just prior to the full compression thereof, clutch lever 20 again begins to rotate counterclock-wise, moving synchronously with the continued movement of piston 25 until said piston has reached the end of its stroke. As soon as clutch lever 20 again begins to rotate counter-clock-wise, the driving and driven elements of said clutch begin to disengage, the full disengagement being effected in a comparatively short travel of piston 25 as represented by A of Fig. 9. Upon release of vacuum in cylinder 24 by reversed operation of valve 26, piston 25 and balancing unit 30 move to the right at a substantially uniform rate of travel, clutch lever 20 rotating clock-wise and moving substantially synchronously therewith until the driven elements of said clutch begin to engage the driving elements thereof, whereafter the clock-wise rotation of clutch lever 20 begins to retard with respect to the movement of piston 25 and connecting rod 35 secured thereto, whereupon spring 33 begins to extend. At the point of initial engagement of the driving and driven elements, the pressure of spring 33 and the pressure of the spring effecting engagement of said driving and driven elements is substantially proportionally balanced, all lever connections between said lines of pressure being considered. Whereas the engaging pressure between said driving and driven element is substantially nil when initially engaged, as spring 33 extends, this pressure becomes gradually greater. Referring to Fig. 10, the distance of pressure curve P from the left margin of the chart to the point X represents a travel of piston 25, unit 30 and clutch lever 20 substantially in synchronism. As said driving and driven elements engage, and spring 33 extends, the engaging pressure between said driving and driven elements builds up as shown by the portion of pressure curve P extending between points X and Y corresponding to a clutch lever travel B, which it will be noted, is several times greater the corresponding travel A of a conventional clutch engaging mechanism shown in Fig. 9. Point Y on curve P represents full engagement of said driving and driven elements, and the remainder of said curve to the right of point Y, represents the substantially synchronous movement of piston 25, balancing unit 30 and clutch lever 20 after full engagement of said driving and driven elements, corresponding to the lost motion between said driven elements and said parts of the mechanism effecting engagement and disengagement thereof between said driving elements.

Assume that it is desired to manually effect disengagement and re-engagement of the driving and driven elements, at the same time producing soft engagement therebetween. Disengagement of said elements is effected by depressing foot pedal 21 thereby compressing spring 21c, one end of which impinges on collar 21b, formed on square shaft 21a, extending through square opening 21d, of housing 21e, suitably secured to clutch lever 20. Prior to full compression of spring 21c, said lever 20 begins to rotate counter-clockwise and effect disengagement of said clutch, as more fully hereinbefore described. Upon gradually releasing the manual pressure on foot pedal 21, and gradually retracting the operator's foot thereon, both said clutch lever and said foot pedal move clock-wise substantially synchronously until the driving and driven elements of said clutch begin to engage, whereupon the movement of lever 20, begins to retard with respect to the movement of foot pedal 21, thereby effecting a soft engagement of said driving and driven elements, the full engagement therebetween being effected when collar 21b again seats in housing 21e.

Referring to Fig. 11 the function of coiled spring 115 is similar to that of spring 32, the mechanism shown in this figure being a balancing unit corresponding in function to unit 30, however, being modified with respect to location, said balancing unit being placed between a clutch lever, as 110, and a clutch operating shaft, as 111, corresponding to shaft 4 of Figs. 2 and 3. When employing this form of balancing unit or mechanism, for power operation, piston 25 is preferably directly link connected to the clutch lever, as 110, the balancing unit, as 30, being omitted. As hereinbefore stated, this form of balancing unit it to be preferred when said balancing units are incorporated in newly manufactured motor driven vehicles, wherein soft clutch engagement is desired by either power, or manual operation of a clutch lever, as 110, the foot pedal 21 being formed integrally with clutch lever 110, and in which instance the auxiliary manually operated balancing unit parts 21a, 21b, 21c, 21d and 21e are omitted.

Referring to Figs. 12 and 13 showing another modified mechanism for soft engagement of clutches, driving member 120 is arranged to engage driven member 121 slidable on but arranged to rotate shaft 122, said members being normally engaged by spring 123. Driving member 121 is axially moved by forked lever or clutch operating member 124 fixed on shaft 125 rotatably mounted in suitable bearings not shown. Lever 124 supports stud or shaft 126 rotatively supporting drum or pulley member 127 including pinion or secondary speed reducing member 128 secured thereto, said pinion meshing with gear sector or primary speed reducing member or reduction member 129 rotatable on shaft 125 but restrained from axial movement thereon. Lever 124 also includes stop lug 130 engaging stop screw 131 adjustably locked to lug 132 formed on gear sector 129. Movement of gear sector 129 counterclockwise is limited by adjusting screw 133 locked to fixed boss or portion 134 by lock nut 135. Drum or pulley member 127 has one end of band or cable 136 secured thereto for winding onto and off said member and the free end thereof secured to clevis member 137 pivoted to the lower end 138 of clutch operating pedal 139 pivoted on stud 140. Clevis 137 is also adjustably secured to power operated rod 141 actuated by piston 25 of power operating unit or mechanism 24 hereinbefore described.

Whereas the pinion 128 and gear sector 129 have been shown as having a number of teeth for enmeshment, said pinion may have a single roller tooth 128b formed on a shank 128a as shown in Fig. 14. Also gear sector 129 may be modified to include a single tooth space 129b on gear sector or reduction member 129a also shown in Fig. 14.

Referring to the operation of the modified form of clutch operating mechanism shown in Figs. 12, 13 and 14, the modification shown in Figs. 12 and 13 is assumed to have the driving and driven elements in engaged position for transmitting power therebetween, the power operated piston 25 being assumed to be at the outward end of its stroke or movement. As vacuum from motor 2 is transmitted to unit 24 by operation of rod 26a by depressing an accelerator pedal as 40 or 91, or by depressing clutch pedal 139 manually, the rod 141 and band or cable 136 are drawn to the right thereby rotating drum 127 and pinion 128. Since drum 127 is free to rotate on stud 126, pinion 128 will act to rotate gear sector 129 counterclockwise, however, since said sector is engaging stop screw 133, the rotation of said pinion will act to slowly rotate clutch operating lever 124 clockwise and this movement will be comparatively slow with respect to the travel of band or cable 136, being proportional to the pitch diameters of said pinion and drum 127. During this movement of lever 124 which comprises the engaging and disengaging period of the clutch, the gear sector 129 has remained stationary until the stop portion 130 reaches stop screw 131, at which time the disengaging period of travel of lever 124 has been completed and the lost motion or disengaged period begins, both the lever 124 and the gear sector moving synchronously as band or cable 136 continues to move to the right. The movement of lever 124 during the disengaging travel corresponds to A of Fig. 9 whereas the movement or travel of the band or cable 136 and piston 25 corresponds to B of Fig. 9. It is to be noted that with a fixed rate of travel of piston 25 and band or cable 136, the travel of lever 124 and therefore driven member 121 is also at a fixed rate of travel but at a comparatively slower rate of travel. Upon releasing said vacuum in unit 24 the reverse of the above described operation occurs, the band or cable and lever 124 travelling synchronously until sector 129 engages stop screw 133 whereupon said sector ceases movement but said lever 124 is more slowly moved until the driving and driven elements 120 and 121 are fully engaged, the stop portion 130 moving away from stop screw 131. When engaging the clutch, the gear sector 129 engages fixed stop 133 prior to initial engagement of clutch members 120 and 121.

It is to be noted that in the modification shown in Figs. 12, 13 and 14, the driven member 121 and power operated unit 24 are positively relatively moved during the engagement of said driving and driven elements, thereby insuring a constant rate of travel which is highly essential to obtain soft clutch engagement, this constant rate of relative travel being obtained irrespective of friction of the moving parts in the clutch operating mechanism. This modification therefore is to be preferred over the spring balanced unit as 30 which does not provide such a constant relative rate of travel where friction in said moving parts occurs, the travel being irregular and proportional to the coefficient of friction of said clutch operating mechanism or part and the spring pressures effecting clutch engagement.

Referring to Figs. 3, 5 and 6, accelerator pedal 40 is normally returned to released position by a comparatively weak spring 29 and normal operation of said accelerator comprises in moving a foot portion from released position as shown until boss 44 engages button 71 of circuit controller 70 at which time the throttle valve is in full open position and lever 15 engages stop 17, pedal 40 being normally operated between these positions for operation of vehicle 1. Spring 81 of circuit controller 70 is normally under compression and of a comparatively higher tension than spring 29 and therefore even though the foot extension 43 be depressed against button 71 with considerable pressure circuit controller 70 will not be normally operated, if however an excessive pressure is exerted on extension 43, as for example, if the operator believes he is depressing the brake pedal, accelerator 40 will further move in clockwise rotation thereby depressing button 71 and opening the ignition circuit as more fully hereinafter described. Since throttle valve lever 15 engages stop 17 the aforesaid further rotation of accelerator pedal 40 will act to move rod 46 and collar 51 to the left thereby compressing spring 50 and moving adjusting nuts 49 away from boss 48. Simultaneously with the aforesaid movement of button 71 and rod 46, rod 55 is also moved to the left. It is to be noted that when throttle valve lever 15 has been moved to the full open position and engages stop 17, that adjusting nuts 59 on rod 55 will engage, or be in close approximation to, boss 60, therefore the additional rotation of accelerator lever 40 in operating button 71 will cause adjusting nuts 59 to engage and move lever 57 in counterclockwise direction thereby moving brake rod 11 and applying brakes to the vehicle. Also upon depressing button 71, solenoid 53 is energized thereby moving armature 52 to the left and exerting a pull on rod 55 additional to that furnished by accelerator pedal 40 as will be more fully hereinafter described.

Referring to Fig. 6, battery 120 supplies energy through ignition switch 121 to contacts 79—79 of circuit controller 70 and thence to ignition system 122 of said vehicle 1. Energy from switch 121 is also supplied to normally open contacts 80—80 and thence to solenoid 53 and normally open circuit controller 54, said last named circuit controller controlling flow of energy to horn 123 of said vehicle. As shown ignition system 122 will be normally energized upon closing ignition switch 121, however upon depressing button 71 of circuit controller 70 the plunger unit 76 is moved downwardly thereby establishing a circuit between circuit closers 80—80 to solenoid 53 and energizing the same. Upon energizing said solenoid and moving armature 52 thereinto circuit controller 54 establishes a circuit to horn 123 causing its operation providing switch 124 is closed. Horn 123 is also controlled by the usual horn button 125.

Referring to Fig. 7, the throttle valve is closed to the idling position upon movement of lever 94 to either of the extreme positions C—C shown and is fully open when said lever is in the "0" position, namely, when said lever 94 and rod 95 are in alignment. Upon initially depressing lever 91 from the fully released position shown, lever 94 acts to open the throttle valve, moving lever 15 away from stop 16 toward stop 17. After lever 91 has been depressed substantially one-half way, said throttle will be fully open and lever 15 engaging stop 17. Further depressing lever 91 until boss 44 engages button 71 will act to move lever 94 from the "0" position to the lower "C" position thereby moving lever 15 from stop 17 to stop 16 and closing the throttle valve to the idling position. It is to be noted that in this form, lever 15 has a comparatively rapid movement with respect to lever 91 during the initial movement of said last named lever from either the fully released or depressed positions of lever 91, and conversely lever 15 has a comparatively slow movement with respect to lever 91 during its median travel of said last named lever. This form is therefore preferable for use on vehicles whose operators are normally driving said vehicles in the higher speed brackets.

Referring to Fig. 8, as hereinbefore described lever 1 has a comparatively large travel with respect to lever 15 during the initial and depressed positions thereof and a comparatively slow rate of travel with respect to lever 15 during the median travel thereof and this form of accelerator control is to be preferred by operators who drive their cars within the lower speed brackets, especially if they are compelled so to do by traffic regulations.

It is to be understood that upon the compression of the balancing springs, as 21c, 32 and 115 they will preferably exert a pressure approximating the pressure exerted upon the operating parts acted upon by the pressure of the clutch spring when the clutch is being engaged.

It is to be noted that when the circuit controller 54 is employed horn 123 is automatically energized upon depressing button 71 in emergency or inadvertently.

For more full understanding, the periods of travel of the clutch operating mechanism during movement thereof prior to initial disengaging and after full disengagement or prior to initial engaging and after full engagement of said driving and driven elements of the clutch will be termed the lost motion periods and the periods of travel thereof from initial disengagement to full disengagement, or initial engagement to full disengagement of said elements will be termed the engaging periods.

It is to be understood that the compressed pressure of balancing spring 33 when in the extended position as shown is preferably greater than the tension of lost motion spring 25' whereby the clutch lever 20 and the operating members of power operated device 23 will move substantially synchronously during the lost motion period prior to the initial disengaging of the driving and driven elements of the clutch as piston 25 moves to the left, said clutch lever and operating members also move substantially synchronously after the full engagement of said driving and driven elements as said piston moves to the right.

It is to be understood that during the disengaging and re-engaging movement or period of the driven elements with respect to the driving elements of said clutch on vehicle 1, corresponding to the travel or movement portion A of power curve P Fig. 9, and which also corresponds to the travel or movement of clutch lever 20, neglecting the lost motion or travel periods, the movement of the operating mechanism or member of the power operated device 23, as for example the piston 25 and connecting rod 35, has a travel or movement corresponding substantially to the portion B of power curve P in Fig. 10, and therefore a variable relative movement occurs between said clutch lever 20 and the mechanism operated thereby, as for example, said piston and connecting rod, said variable relative movement or travel being effected by the compression of spring 33 during the disengaging and re-engaging periods of said driving and driven elements.

By producing the comparatively slow or predetermined rate of relative movement between the clutch operating lever 124 and the clutch lever 139 or power operated device 24 just prior to the initial engagement of clutch members 120 and 121 a more gentle or soft engagement is obtained than with the form shown in Figs. 2 and 3 wherein a relative movement does not occur until after said initial engagement and wherein said relative movement is not at a predetermined rate of relative movement but varies in proportion to the engaging resistance of said clutch members.

Clutch lever 110 is moved to full released position during the lost motion periods by a comparatively weak spring not shown, similar to spring 25.

Whereas I have shown the preferred embodiments of the invention in the drawings, it will be obvious to those skilled in the art that modifications thereof may be made without departing from the spirit of the invention.

What I claim is:

1. In clutch operating apparatus, a clutch having driving and driven elements arranged to be engaged for synchronous rotation, and disengaged for independent rotation, a resilient member operated during the disengagement and re-engagement of said elements normally effecting engagement therebetween, clutch operating mechanism having a lost motion range of travel and a clutch engaging and disengaging range of travel, a clutch operating member, and means including reduction gearing connecting said clutch operating member and said clutch operating mechanism for effecting a synchronous movement therebetween during the lost motion travel thereof and a relative movement therebetween during the clutch disengaging and re-engaging travel thereof.

2. In clutch operating apparatus, a clutch having driving and driven elements arranged to be engaged for synchronous rotation and disengaged for independent rotation, a spring operated during the disengagement and re-engagement of said elements normally effecting engagement therebetween, clutch operating mechanism having a lost motion range of travel and a clutch engaging and disengaging range of travel, a clutch operating member, and means including reduction gearing connecting said operating member and said clutch operating mechanism for effecting a synchronous travel therebetween during the lost motion travel thereof and a relative travel therebetween during the clutch engaging and disengaging travel thereof.

3. In clutch operating apparatus, a clutch, clutch operating mechanism, a pivoted clutch actuating member having the free end portion thereof arranged to engage and disengage said clutch, a stop portion on said actuating member, a pivoted reduction member including a stop portion for engaging the stop portion on said actuating member, a fixed stop for engaging said reduction member positioned to permit a predetermined relative pivotal movement between said actuating and reduction members when said actuating member stop portion is moved away from said reduction member stop portion and before said reduction member engages said fixed stop, and means operated by said clutch operating mechanism for effecting a predetermined rate of travel of said relative movement and a simultaneous movement of said members after said actuating member stop portion has engaged said reduction member stop portion.

4. In clutch operating apparatus, a clutch, a clutch operating member having engaging and disengaging travel and lost motion travel for operating said clutch, a clutch pedal, means operated by said clutch pedal for producing a predetermined relative rate of movement between said clutch operating member and said pedal during said engaging and disengaging travel, means for producing a synchronous movement of said member and said pedal during said lost motion travel, said relative rate of movement being established prior to initial engagement of said clutch when engaging the same.

5. In clutch operating apparatus, a clutch, a clutch operating member having engaging and disengaging travel and lost motion travel for operating said clutch, a power operated device, means operated by said device for producing a predetermined rate of relative movement between said member and said device during said engaging and disengaging travel, means for producing a synchronous movement of said member and said device during said lost motion travel, said relative rate of movement being established prior to initial engagement of said clutch when engaging the same.

6. In clutch operating apparatus, a clutch, a clutch operating member having engaging and disengaging travel and lost motion travel for operating said clutch, a speed reducing member movable independently of said operating member, a clutch pedal, means operated by said pedal operatively connecting said members for producing a predetermined rate of relative movement between said members during said engaging and disengaging travel, and means for producing synchronous movement between said members during said lost motion travel.

7. In clutch operating apparatus, a clutch, a clutch operating member having engaging and disengaging travel and lost motion travel for operating said clutch, a speed reducing member operable independently of said operating member, a power operated device, means operated by said device operatively connecting said device and member for producing a predetermined rate of relative movement between said device and said member during said engaging and disengaging travel, and means for producing synchronous movement between said device and said member during said lost motion travel.

8. In clutch operating apparatus, a clutch, a pivoted clutch operating member having engaging and disengaging oscillating movement and lost motion oscillating movement, a pivoted speed reducing member oscillatable independently of said operating member, a clutch pedal, means operated by said pedal for producing a predetermined rate of relative oscillation between said members during said engaging and disengaging movement when said pedal is operated in one zone, and means for producing synchronous oscillating movement between said members during said lost motion movement when said pedal is operated in another zone.

9. In clutch operating apparatus, a clutch, a pivoted clutch operating member having engaging and disengaging oscillating movement and lost motion oscillating movement, a pivoted speed reducing member oscillatable independently of said operating member, a power operated device, means operated by said device for producing a predetermined rate of relative oscillation between said members during said engaging and disengaging movement when said device is operated in one zone, and means for producing synchronous movement of said members during said lost motion movement when said device is operated in another zone.

10. In clutch operating apparatus, a clutch, a clutch operating member having engaging and disengaging travel, and lost motion travel, for operating said clutch, a primary speed reducing member movable independently of said operating member, and means including a secondary speed reducing member pivoted on and bodily moved by said clutch operating member engaging said primary speed reducing member for producing a predetermined rate of relative movement between said operating member and said primary speed reducing member during said engaging and disengaging travel and a synchronous movement thereof during said lost motion travel.

11. In clutch operating apparatus, a clutch, a clutch operating member having engaging and disengaging travel and lost motion travel for operating said clutch, a primary speed reducing member movable independently of said operating member, and means including a secondary speed reducing member pivoted on said clutch operating member engaging said primary speed reducing member and fixed and movable stops for producing a predetermined rate of relative movement between said operating member and said primary speed reducing member during said engaging and disengaging travel and a synchronous movement thereof during said lost motion travel.

12. In clutch operating apparatus, a clutch, a clutch pedal, a clutch operating member having engaging and lost motion travel for operating said clutch, and means responsive to movement of said pedal including pivoted members and fixed and movable stops for producing a predetermined rate of relative movement between said pedal and said clutch operating member during said engaging travel of said clutch operating member and a synchronous movement thereof during said lost motion travel of said operating member, said relative movement being established prior to initial engagement of said clutch.

13. In clutch operating apparatus, a clutch, a power operated device, a clutch operating member having engaging and lost motion travel periods, for operating said clutch, and means responsive to movement of said device including pivoted members and fixed and movable stops for producing a predetermined rate of relative movement between said device and said clutch operating member during said engaging period of travel of said clutch operating member and a synchronous movement thereof during said lost motion travel period of said operating member, said relative movement being established prior to the initial engagement of said clutch whereby said clutch operating member is moving at a comparatively slow rate of travel with respect to said device when said clutch is engaged.

OSCAR A. ROSS.